May 11, 1971 B. J. EISEMAN, JR 3,578,597
MIXTURES OF PERFLUORODIMETHYLCYCLOBUTANE AND TRICHLOROTRIFLUOROETHANE
Filed April 17, 1969
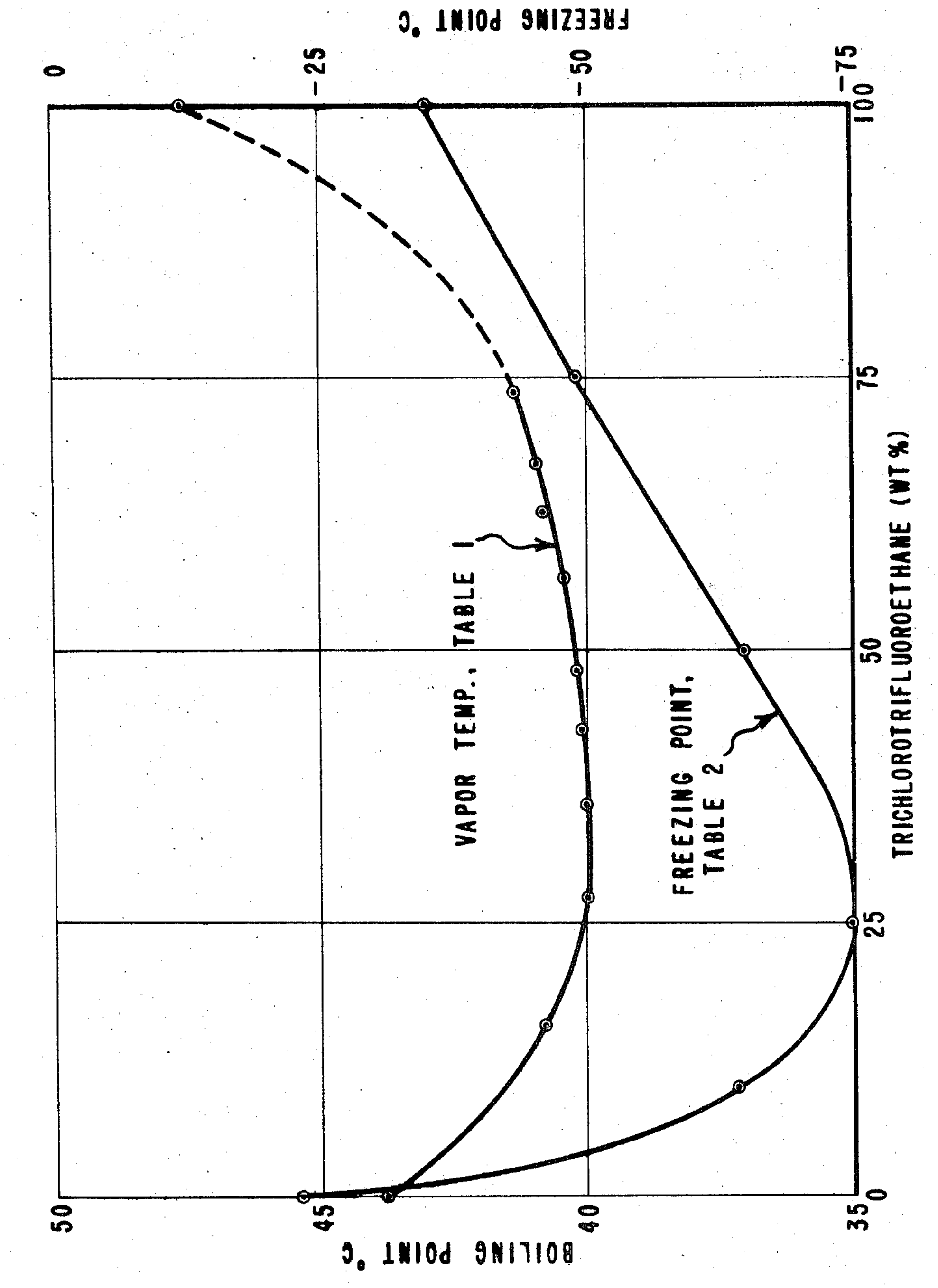
INVENTOR
B. J. EISEMAN, JR.
BY Gary A Samuels
ATTORNEY United States Patent Office 3,578,597
Patented May 11, 1971

3,578,597
MIXTURES OF PERFLUORODIMETHYLCYCLOBUTANE AND TRICHLOROTRIFLUOROETHANE
Bernhardt J. Eiseman, Jr., Wilmington, Del., assignor to E. I. du Pont de Nemours and Company, Wilmington, Del.
Filed Apr. 17, 1969, Ser. No. 816,995
Int. Cl. H01b *3/24*; C09k *3/06*
U.S. Cl. 252—66 4 Claims

ABSTRACT OF THE DISCLOSURE

A mixture of perfluorodimethylcyclobutane with 1,1,2-trichloro-1,2,2-trifluoroethane, said mixture containing about 26 to 42 weight percent 1,1,2-trichloro-1,2,2-trifluoroethane and having an essentially constant boiling point of about 40° C.

BACKGROUND OF THE INVENTION

(1) Field of the invention

This invention relates to a novel mixture of perfluorodimethylcyclobutane and 1,1,2-trichloro-1,2,2-trifluoroethane which may be used as a dielectric coolant.

(2) Description of the prior art

Dielectric fluids usually serve two primary purposes; they provide electrical insulation and transfer heat. They can thus be employed as coolants in electronic equipment systems. One means of accomplishing heat transfer in such systems is to contact the hot electronic components with the fluid whereupon the fluid boils. In such cooling, called ebullient cooling, the vapors are condensed at a cooling surface and the condensed fluid is returned to areas surrounding the electronic components. Ebullient cooling is advantageous, especially in cooling electronic equipment, because there is little temperature gradient across the equipment that is subjected to the coolant. Sharp temperature gradients are undesirable because these can change tolerances thus affecting the tuning of circuits and can even cause destruction of temperature sensitive materials by warping and cracking. Another advantage of the mixture of this invention in ebullient cooling is that it provides dielectric protection in the vapor space of the electronic equipment whereas, for example in the conventional oil-cooled convection system, no protection is provided in the free-board space.

Because of their well-known stability, good heat transfer properties and theoretical availability in a wide range of boiling points, fluoro- and fluorohalo-compounds are known to be useful as dielectric fluids.

However, the choice of a suitable dielectric composition for use as an ebullient coolant is not simple for there are several considerations that enter into its selection. The temperature of the external medium to which heat is transferred is one such consideration. For a given coolant the temperature at which an ebullient coolant is condensed fixes the pressure within the equipment and naturally a high vapor pressure coolant will cause high pressures in the system. Such coolants require specially constructed containers to withstand the generated pressure. Some coolants having high vapor pressures cannot be condensed by ordinary heat transfer to the air or water and special means are required. Thus high vapor pressure coolants are not preferred for use.

Perfluorodimethylcyclobutane has good dielectric properties and favorable vapor pressure properties, i.e., the vapor pressure is low enough (18 p.s.i.a. at 50° C.) that special containers are not needed and yet high enough that the vapors can be condensed on heat exchange with air. Thus perfluorodimethylcyclobutane would appear to be a good ebullient coolant. However, as dielectric ebullient coolants gain acceptance in a wide variety of applications, the requirements placed on the coolant become more stringent. For example, the operable temperature range both upward and downward may be broadened. More specifically, it is desirable that a coolant remain liquid at low temperatures so that it may be employed in low temperature operations. Freezing of the coolant may damage sensitive components when it is employed as a dielectric coolant for electronic equipment. Perfluorodimethylcyclobutane freezes at about −23° C. and is thus limited in its use despite its otherwise favorable dielectric properties.

However it has now been discovered that upon mixing the perfluorodimethylcyclobutane with trichlorotrifluoroethane in selected proportions an essentially constant boiling liquid (necessary to an ebullient coolant) is obtained which possesses good dielectric properties and which has a freezing point much lower than −23° C.

SUMMARY OF THE INVENTION

The invention is directed to an essentially constant boiling composition consisting of from about 74 to 58 weight percent perfluorodimethylcyclobutane and about 26 to 42 weight percent 1,1.2-trichloro-1,2,2-trifluoroethane. This composition has an essentially constant normal boiling point of about 40° C. The composition also exhibits a freezing point minimum of about −75° C. when the amount of trichlorotrifluoroethane present is about 27 weight percent.

DESCRIPTION OF THE DRAWING

The top line appearing on this graphic drawing shows the temperature in ° C. at which various weight percent mixtures of perfluorodimethylcyclobutane and trichlorotrifluoroethane will boil, using the *y* axis located on the left to determine the temperature and the *x* axis to determine the weight percent trichlorotrifluoroethane present in the mixture.

The bottom line appearing on this graphic drawing shows the temperature in ° C. at which the first crystals appear in freezing various weight percent mixtures of perfluorodimethylcyclobutane and trichlorotrifluoroethane using the *y* axis located on the right to determine the temperature and the *x* axis to determine the weight percent trichlorotrifluoroethane present in the mixture.

DESCRIPTION OF THE INVENTION

As stated previously, a mixture of about 74 to 58 weight percent perfluorodimethylcyclobutane and about 26 to 42 weight percent 1,1,2-trichloro-1,2,2-trifluoroethane has been found to have an essentially constant boiling point of about 40° C. This can be seen by reference to the top line of the graphic drawing where the boiling point is 40.0° C. when the weight percent of trichlorotrifluoroethane present is between 27.2 and 35.9 and where the boiling point is about 40.01 at 42 weight percent trichlorotrifluoroethane.

It has also been discovered that these mixtures have low melting points, below −65° C., which are significantly below the minimum melting points of the individual components i.e., −23° C. for perfluorodimethylcyclobutane and −35° C. for 1,1,2-trichloro-1,2,2-trifluoroethane and also that one composition has a minimum melting point of about −75° C. as can be seen on the bottom line of the graphic drawing perfluorodimethylcyclobutane and trichlorotrifluoroethane form a eutectic mixture melting at about −75° C. which contains about 27 weight percent trichlorotrifluoroethane. The mixture in this region is eutectic; and the freezing point at 42 weight percent trichlorotrifluoroethane is about −69° C., still far below the minimum melting points of the individual components.

It has further been discovered that the good dielectric properties of perfluorodimethylcyclobutane are not substantially altered after admixture with 1,1,2-trichloro-1,2,2-trifluoroethane.

The compositions of this invention are thus seen to possess advantageous properties not exhibited by one or the other of the individual components alone.

The perfluorodimethylcyclobutane employed in the compositions of this invention is a mixture of isomers obtained by the cyclodimerization of perfluoropropylene as described in McCane U.S. Pat. 3,316,312 by heating the perfluoropropylene to 250–600° C. It has been previously recognized that using conventional distillation techniques three fractions can be separated therefrom. These fractions may be designated as A (pure 1,2-cis-perfluorodimethylcyclobutane, B (1,2-trans-perfluorodimethylcyclobutane), and C (cis and trans 1,3-perfluorodimethylcyclobutanes). Further it is recognized that the temperature of formation will vary the composition of the dimer. At temperatures of 250° C. to 350° C. fractions A and B will be formed almost exclusively in approximately equal amounts with only traces of fraction C being present. Fraction A is favored somewhat at the lower temperature while fraction B is favored at higher temperatures of about 390° C. When the temperature is increased to about 450° C., the previously insignificant fraction C will become the favored fraction. Gas chromatograph analysis has shown that of the reaction products used in preparation of the mixtures of this invention, the cis-perfluoro-[1,2-dimethylcyclobutane] constituted about 53 to 72 weight and mol percent (weight and mole percents are the same) of the resultant product mixture, trans-perfluoro-[1,2-dimethylcyclobutane] constituted about 47 to 28 weight and mol percent of the mixture, and cis, trans forms of the 1,3-dimethyl isomer were present in traces. All mixtures are equivalent in terms of the instant invention.

Preparation of 1,1,2-trichloro-1,2,2-trifluoroethane may be carried out by any art known method such as that described in "Chemistry of Organic Fluorine Compounds" by Milos Hudlicky, published by The Macmillan Company, New York, 1962, on page 337. The compositions of the present invention are prepared by mixing the components in the desired concentration.

The following examples are intended to be merely illustrative of the invention and not in limitation thereof. Unless otherwise indicated, all parts are by weight.

Abbreviations used throughout these examples are:

Perfluorodimethylcyclobutane—PDCB
1,1,2-trichloro-1,2,2-trifluoroethane—TCTF

EXAMPLE 1

This example demonstrates the existence of a minimum boiling point azeotrope within the range of about 74.0 to 58.0 weight percent PDCB and 26.0 to 42.0 weight percent TCTF.

The equipment for this example consisted of a 200 cc. round-bottom flask fitted with reflux condenser, a calibrated addition funnel, and a thermometer. The thermometer was placed in the vapor space in such a way that the reflux liquid did not pass over the bulb. A temperature-corrected barometer was used to measure atmospheric pressure.

(a) PDCB cc., 41.8 g. and having a density of 1.67 g./cc. at 25° C.) was placed in the flask and brought to boiling. TCTF (having a density of 1.57 g./cc. at 25° C.) was added in the portions seen in Table I from the addition funnel After each TCTF addition, the temperature in the vapor space was recorded when constant and the barometric pressure was measured periodically. TCTF was added until the mixture passed through the azeotropic range.

The results are shown in Table 1.

TABLE 1

| | Cumulative added (cc.) TCTF | Wt. percent TCTF | Barometric pressure (corrected) (mm. Hg) |
|---|---|---|---|
| Boiling point (° C.): | | | |
| 43.8 | 0 | 0 | 757.52 |
| 40.8 | 5 | 15.7 | |
| 40.0 | 10 | 27.2 | |
| 40.0 | 15 | 35.9 | |
| 40.1 | 20 | 42.8 | |
| 40.2 | 25 | 48.3 | |
| 40.4 | 35 | 56.7 | 756.8 |
| 40.8 | 45 | 62.7 | |
| 40.9 | 55 | 67.3 | |
| 41.3 | 75 | 73.7 | |

(b) TCTF (25 cc.) was placed in the flask and brought to boiling and the boiling point and barometric pressure were checked. The results were:

| | |
|---|---|
| Boiling point (° C.) | 47.6 |
| Wt. percent TCTF | 100 |
| Barometric pressure (corrected) mm. Hg | 753.9 |

The top line of the attached drawing depicts graphically the correlation between boiling point and weight percent of TCTF present in the TCTF/PDCB mixture. With 0 percent TCTF present the boiling point is 43.8° C., the boiling point of pure PDCB, while with 100 percent TCTF present the boiling point is 47.6° C., the boiling point of pure TCTF. It should be noted that a weight percent of TCTF of from about 26 to 42 percent the nearly straight line of the drawing clearly indicates an essentially constant boiling point of about 40° C.

EXAMPLE II

Example 2 demonstrates the existence of a minimum melting point in a mixture of about 27 wt. percent TCTF and 73 wt. percent PDCB.

About 10 cc. each of several mixtures of TCTF and PDCB were placed in glass tubes fitted with an inside thermocouple and an electrically driven stirrer. The tubes protected from moisture by an upward oriented tube surrounding the stirrer shaft were lowered into the vapor space above liquid nitrogen in an unsilvered Dewar flask. The temperature was recorded to the nearest degree Centigrade when the first crystals were observed. In samples containing about 25 wt. percent TCTF there was no difference in temperature at the point when the first crystals formed and when the entire sample was nearly frozen, indicating the existence of a minimum eutectic point in this region.

The results are seen in Table 2.

| TCTF (wt. percent in PDCB): | Temp. on appearance of first crystals (° C.) |
|---|---|
| 0 | −23 |
| 10 | −64 |
| 25 | −75 |
| 50 | −65 |
| 75 | −49 |
| 100 | −35 |

The bottom line of the attached drawing depicts graphically this correlation between freezing point and weight percent of TCTF present in the TCTF/PDCB mixtures. With 0 precent TCTF present the freezing point is −23° C., the freezing point of pure PDCB; with 100 percent TCTF present the freezing point is −35° C., the freezing point of pure TCTF. It should be noted that the freezing points of the TCTF/PDCB mixtures are far below those of the individual components and that a minimum freezing point of about −75° C. is attained when the TCTF concentration is about 27 weight percent. This 27 weight percent TCTF to 73 weight percent of PDCB ratio surprisingly but clearly falls within the TCTF:PDCB weight percent ratio described and shown in Example 1 for mixtures of these components having an essentially constant boiling temperature i.e. 26–42 weight percent TCTF: 74–58 weight percent PDCB.

EXAMPLE III

Example 3 demonstrates that the electrical properties of PDCB are not substantially affected by admixture with TCTF.

In the liquid phase the results of standard ASTM tests are seen in Table 3.

TABLE 3

| Property | ASTM method | PDCB | TCTF | PDCB/TCTF 71/29 (wt.) |
|---|---|---|---|---|
| Specific resistance, ohn/cm | D-1169 | $>4\times10^{14}$ | $>2\times10^{15}$ | $>2\times10^{15}$ |
| Dielectric strength, kv. (RMS) [1] | D-877 | 42 | 35 | 35 |
| Dielectric constant | D-924 | 1.85 | 2.41 | 2.02 |
| Dissipation factor, percent [2] | D-924 | <0.006 | <0.006 | <0.006 |

[1] 0.1 inch gap.
[2] 100 Hz/sec.

NOTE—KV=kilovolts; RMS=root mean square.

When used as ebullient coolants, these mixtures of perfluorodimethylcyclobutane and 1,1,2-trichloro-1,2,2-trifluoroethane function to remove heat by boiling at a source of heat, e.g., an electronic device, thus maintaining the source near or at the temperature corresponding to the boiling point of the ebullient coolant. The resultant vapors are condensed in a condenser generally separate from the housing containing the heat source and in heat exchange relationship with, for example, cooling water or, more usually, the atmosphere. In some installations the walls of the housing itself, e.g. equipped with fins, are used as the condensing surface. The system may be closed or open to the atmosphere at the outside end of a separate condenser. A closed system is generally preferred because atmospheric contaminants are thus prevented from entering the system. When a closed system is used, it is usual to remove air by pumping before sealing.

In an open system the overall temperature of the steady state system is the temperature of the boiling point of the coolant at atmospheric pressure. In a closed air-free system the overall temperature is approximately the boiling point of the coolant at the pressure corresponding to the vapor pressure of the coolant in the coolest part of the equipment, i.e., the condenser. The approximate pressure inside the housing is likewise fixed at the vapor pressure of the coolant in the coolest part.

The compositions of this invention may be useful as refrigerants. Their boiling points lie intermediate between trichlorofluoromethane and 1,1,2-trichloro-1,2,2-trifluoroethane, both of which are widely used as centrifugal refrigerants. At refrigeration loads intermediate between those characteristic of the above refrigerants, the compositions may offer technical advantage through their high average molecular weight.

The embodiments of the invention in which an exclusive property or privilege is claimed are defined as follows:

1. An essentially constant boiling composition consisting of from about 74 to 58 weight percent perfluorodimethylcyclobutane and from about 26 to 42 weight percent 1,1,2-trichloro-1,2,2-trifluoroethane, said composition having an essentially constant boiling point of about 40° C.

2. An essentially constant boiling composition according to claim 1 having a minimum freezing point of about −75° C. at about 27 weight percent 1,1,2-trichloro-1,2,2-trifluoroethane and 73 weight percent perfluorodimethylcyclobutane.

3. An essentially constant boiling composition according to claim 1 wherein the perfluorodimethylcyclobutane consists of a mixture of isomers of about 100 weight percent cis and trans 1,2-perfluorodimethylcyclobutane and traces of cis and trans 1,3-perfluorodimethylcyclobutane.

4. An essentially constant boiling composition according to claim 3 wherein the mixture of perfluorodimethylcyclobutane isomers consists of about 53 to 72 weight percent 1,2-cis-perfluorodimethylcyclobutane, about 47 to 28 weight percent 1-,2-trans-perfluorodimethylcyclobutane and traces of cis and trans 1,3-perfluorodimethylcyclobutane.

References Cited

UNITED STATES PATENTS

| | | | |
|---|---|---|---|
| 1,953,216 | 4/1934 | Elsey | 252—66XR |
| 2,999,817 | 9/1961 | Bower | 252—172 |
| 3,316,312 | 4/1967 | McCane et al. | 260—648 |

JOHN T. GOOLKASIAN, Primary Examiner

L. T. KENDELL, Assistant Examiner

U.S. Cl. X.R.

252—78